United States Patent
Khalid et al.

(10) Patent No.: US 9,684,925 B2
(45) Date of Patent: Jun. 20, 2017

(54) PRECISION ENABLED RETAIL DISPLAY

(71) Applicant: Cellco Partnership, Basking Ridge, NJ (US)

(72) Inventors: Mohammad Raheel Khalid, Budd Lake, NJ (US); Ji Hoon Kim, Lyndhurst, NJ (US); Samir S. Vaidya, Highland Park, NJ (US); John P. Chin, Upper Montclair, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 541 days.

(21) Appl. No.: 14/251,890

(22) Filed: Apr. 14, 2014

(65) Prior Publication Data

US 2015/0294398 A1 Oct. 15, 2015

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0631* (2013.01)

(58) Field of Classification Search
CPC ................ G06Q 30/0639; G06Q 30/0631
USPC ......................................... 705/26.1
See application file for complete search history.

(56) References Cited

U.S. PATENT DOCUMENTS

| 5,880,449 A | * | 3/1999 | Teicher | ............... G06Q 20/343 235/375 |
| 2008/0135574 A1 | * | 6/2008 | Hieb | ..................... G07F 11/10 221/123 |
| 2013/0281084 A1 | | 10/2013 | Batada et al. | |
| 2014/0025537 A1 | | 1/2014 | Venkataramu et al. | |
| 2015/0278928 A1 | * | 10/2015 | Nichols | ............. G06Q 30/0639 705/26.9 |

* cited by examiner

*Primary Examiner* — Yogesh C Garg

(57) ABSTRACT

A system includes a highlighter that is installed in a store to highlight a physical position of an item on display in the store. The system also includes a processor installed in the store to determine a location and identification (ID) of a mobile device, and retrieve a profile of a user of the mobile device based on the ID. The processor controls the highlighter to highlight the item when the location of the mobile device is determined to be within a predetermined distance of the item, and when the item is determined to be of interest to the user of the mobile device based on information obtained in the profile.

20 Claims, 11 Drawing Sheets

PRECISION ENABLED RETAIL DISPLAY

BACKGROUND

When visiting a retail store that sells a wide variety of products, it becomes difficult for a consumer to determine what products/services are relevant to their desires or needs. In one example, it may be difficult to determine new products that are compatible with products and/or services that are currently owned by the consumer.

Large stores may offer maps to assist customers in finding the desired section of the premises in which they may find goods or services for which customers wish to shop. However, traditional maps are usually not interactive. For example, the map may be at a fixed location; and if so and if a customer needs to view the map again after having walked away from it, then the customer is required to walk back to the map and begin again. Even if portable, the map is usually paper, and the customer needs to manually compare their apparent position to a desire part of the premises and navigate through to the appropriate location.

Mobile devices and global positioning satellite (GPS) automated navigation have become quite common and popular, and such navigation may offer an alternative form of mapping for retail customers. GPS signals, however may be blocked by building structures; and as a result, GPS based navigation may be ineffective within the buildings of many enterprises. Whether traditional or automated on a mobile device, maps relating to retail premises generally are not well personalized to the products most likely to be of interest to an individual customer.

Even if a mapping service or guidance from store personnel helps to direct a customer to a particular area or display in the retail establishment where a product of interest may be located, the customer often still has to manually find the item of interest from among other similar items offered by the retail establishment. For example, if a customer is looking for an accessory (e.g. case) or consumable good (e.g. printer ink cartridge) for a particular type of electronic device, the map or other guidance may help to find the right area in the store; but once there, the customer must still identify the desired item that goes with the device that the customer already owns or possesses with them in the store.

As a result, most brick and mortar retailers have significant challenges in identifying consumers' desires and needs, and mapping those to the best available products and locations thereof in the store. Conventional brick and mortar retailers previously have often used a more personal approach of directly engaging the consumer to show the customer where to find products of interest and in some cases trying to map the customer's previously purchased products or accounts to related goods or services via a database. This approach, however, is tedious for the consumer and also relies on a store representative to provide the experience. These conventional systems do not provide a supplemental self-service application for customers who like to "browse" the store unassisted by a sales person.

BRIEF DESCRIPTION OF THE DRAWINGS

The figures depict one or more implementations in accordance with the present teachings by way of example only, not by way of limitation. In the figures, like reference numbers refer to the same or similar elements.

DETAILED DESCRIPTION OF EXAMPLES

Figure 1:
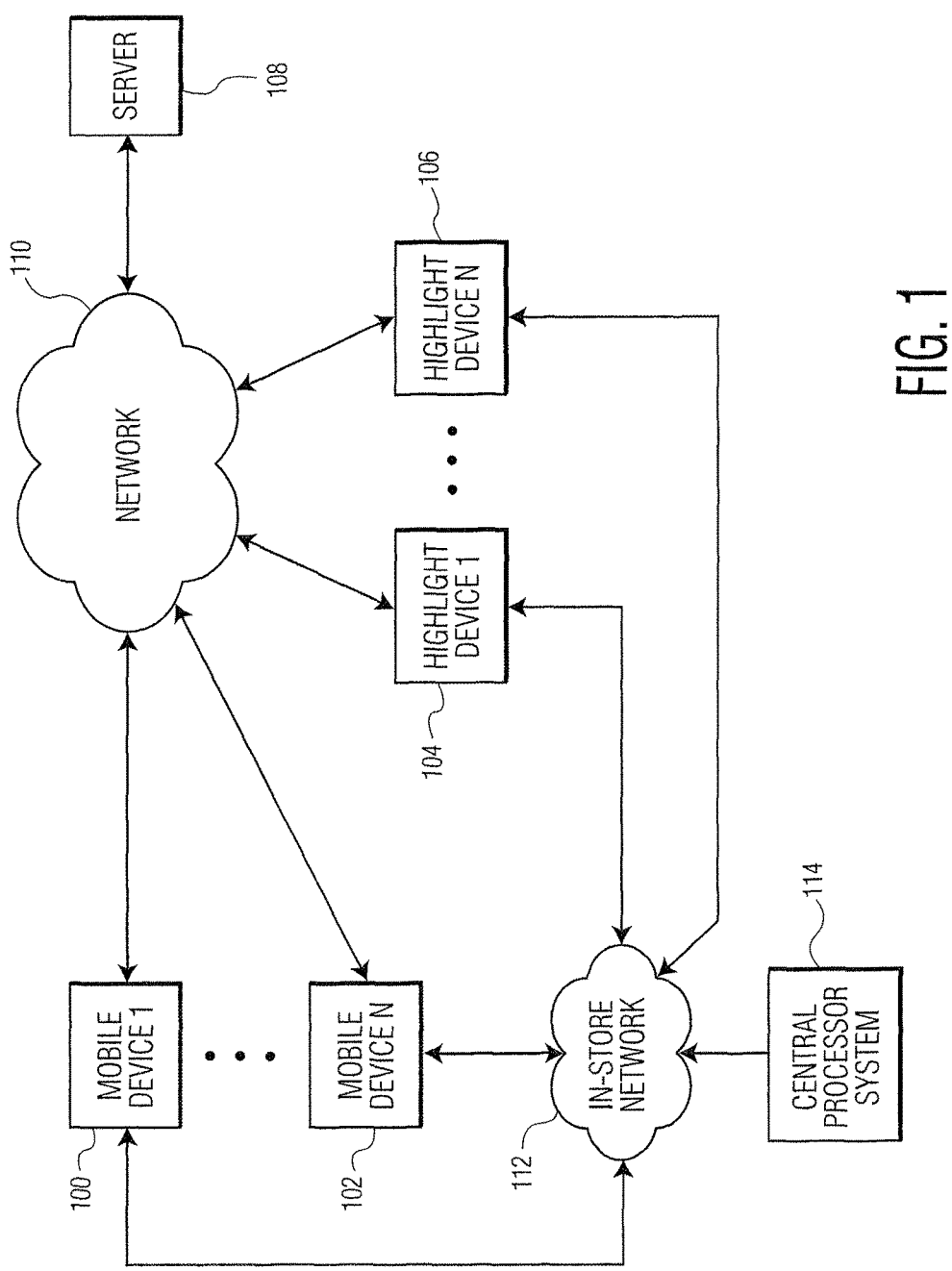
FIG. 1 shows a block diagram of a network for communicating between mobile devices and highlighters.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

A need exists to provide a user with a more personalized in-store experience. More specifically, there is a need to automatically provide a personalized and customizable shopping experience based on a customer profile. This personalized shopping experience may indicate various items (e.g. products) on display throughout the store that may be of interest to the particular shopper, e.g. accessories, consumable goods, services or other items related to a product owned, or a service subscribed to by the shopper, as he or she travels about a retail establishment, by using an appropriate medium (e.g. visual, audio, aroma, physical movement) for presenting the item on display. This will provide the shopper/user with a better shopping experience where the shopper can learn about products/services at their own pace based on highlighted items on the shelves and their associated product information.

For example, items of interest may include accessories to a mobile phone owned by the shopper, ink cartridges for a printer owned by the shopper, warranty services for electronic products owned by the shopper, mobile service plans/upgrades for the mobile phone owned by the shopper, etc. It is also contemplated that the items of interest may not be based on a product already owned by the shopper. For example, the items of interest may be suggestions of devices/services that are determined based on personal information and tastes of the shopper. These suggestions may be computed automatically by the system in the store, or a backend server device utilizing algorithms. The personal information and tastes of the shopper may be previously known and stored by the system, or may be provided by the shopper through their mobile device when they are in the store.

One way to accomplish such a personalized experience is with an in-store system that interacts with users' mobile devices and helps to identify relevant products or services displayed at various locations about the retail establishment. Various highlighters (highlight devices) may be installed within the store to highlight specific products on display on store shelves, on store racks and anywhere in the store in general, which are likely to be of interest to the customer, based on a customer profile associated with the customer's mobile device. These highlighters may communicate either directly or indirectly with mobile devices being carried by users throughout the store. When activated, a highlighter provides a humanly perceptible indication to attract attention of a person in the store to item(s) in proximity to the highlighter (i.e. the physical position of the item is highlighted). Examples of mechanisms to highlight products, information displays about available services, etc. are discussed in more detail later.

For purposes of further discussion and illustration of examples of the precision enabled display system and the highlighters used in such a system example, we will assume that the 'items' available for display in a particular enterprise establishment are products and/or services on display and/or being offered in a retail store or the like. Also, although other display arrangements for the products may be used, the example will assume use of a rack appropriately configured for particular types of products, e.g. for accessories for smart phones.

In one example, a particular item on a store rack may be highlighted when the user with the mobile device walks down the aisle and approaches the rack having the item. The item that is highlighted may be identified from among other items displayed in the rack based on a profile of the user that owns the mobile device, for example, based on a relationship of the displayed item to an item or service that the customer already has or may be interested in as identified from the user profile. In general, this profile may be either stored at the highlighter, in the mobile device, or on a backend server working in conjunction with the highlighter and/or mobile device. The backend server may be associated with the personalized shopping service provided at the store, and may be owned by a service provider of the personalized shopping experience.

An example of such a highlighting system is shown in FIG. 1, where various mobile devices 100-102 are currently operating from locations within a store. Various highlighters 104-106 are also located and installed within the store in order to highlight the physical location of various items on display within the store.

In one example, one or more highlighters 104-106 may determine that a particular mobile device is within a predetermined range of particular items (i.e., the consumer is walking down a specific aisle). For example, mobile device 100 being carried by a particular consumer through a store may come in close proximity to highlighter 104. Highlighter 104 in the example includes a beacon transmitter to emit a short range ping signal and a receiver to receive a response from any mobile device in the vicinity, to determine if any mobile devices are within range. The short range ping may be emitted at Bluetooth frequencies that can be received by the mobile devices. The ping may also be transmitted periodically or in response to a Bluetooth signal received from the mobile device itself. The mobile device receives the ping and then realizes through identification information included in the ping that a specific highlighter device is nearby. Since the highlighter is identified, the mobile device may respond to the ping with its own identification information. If mobile device 100 responds to the ping, then highlighter 104 knows that the mobile device, and therefore the consumer, is close to highlighter 104 and the particular item to be highlighted. The response to the ping, in this example, includes an identifier of the mobile device and/or the user of that device.

This communication for proximity detection and ID discovery may be performed either directly between the mobile devices and highlighters, or through an in-store wireless network that may include wireless access points and routers. It is noted that although the highlighter in the above example has a beacon transmitter/transceiver, the beacon may actually be located external to highlighter 104. One or more beacon transmitters may be located at various locations throughout the store so that the locations of the mobile device can be detected with accuracy. One example of such an external beacon is shown as beacon transmitter 250 in FIG. 2.

In one example, upon detecting a mobile device in proximity, a highlighter 104 may communicate with backend server 108 through external network 110 by sending a mobile ID of the mobile device. In such an example, the server 108 stores a profile of the consumer of mobile device 100 accessible based on the received mobile ID. This profile may include information identifying previous purchases (e.g. item types) by the consumer from the retail establishment and/or other entities having a commercial relationship with the establishment, consumer preferences (i.e., likes/dislikes) and other personal information. This profile information may then be utilized to control a particular highlighter in the store to highlight a particular product/service on display.

It should be noted that highlighters 104-106 may independently communicate with the server, or they may be a centralized processor located somewhere within the store location (see 22 in FIG. 2) that will communicate with the server on behalf of the mobile device. Such a centralized processor may coordinate and control the various highlighters within the store based on the mobile device location and profile.

In one example, assume a consumer having mobile device 100 is traveling through a store. Also assume that highlighters 104-106 are mounted to a display (e.g. rack) within the store, or somewhere in close proximity to particular items in a specific aisle. Some of the highlighters 104-106 (e.g. those within a specific range of the mobile device) detect the presence of mobile device 100 and obtain the ID of the mobile device. It is noted that the communication range of each of the highlighters may or may not be restricted to a particular aisle within the store. In one example, the highlighters may operate at typical BlueTooth range.

In response, the profile of the user of the mobile device 100 may be retrieved from server 108 and used to determine which of the items on the rack should be highlighted. The actual items that are on the rack (and therefore able to be highlighted) may also be retrieved from the server or an in-store or external database accessible by at least one of the highlighter device, the mobile device and the server. One or more of the highlighters that detected proximity of the mobile device 100 can then be activated to highlight the associated item(s) determined to be of potential interest to the particular consumer. Assuming that the display is a rack for a particular cellular provider, one or more products such as cellphones and cellphone accessories (i.e. in the mobile device example, the particular accessories that are compatible with the mobile device 100 as indicated by the profile) may be highlighted to the consumer. If the rack displays cases for mobile devices, for example, and the mobile device 100 is a particular model smartphone; each highlighter 104-106 that is associated with a case that fits that smartphone may be activated. Highlighters associated with cases that are not compatible with the particular smart phone model are not activated. The result provides identification to the consumer of one or more compatible cases.

A variety of highlighter output mechanisms are contemplated so that highlighting the item may either be performed by one or more of a light (e.g. area light, directed light, indicator light, etc.), sound (e.g. speaker, sound emitter, etc.), smell (e.g. fan that emits aroma) and movement (e.g. mechanism to physically move the item) of the item so that the consumer can easily distinguish the item(s) of most interest to the consumer among the various other items that may be on the shelf/rack. In one example, the highlighter may include some of the various output mechanisms described above. One of the mechanisms may be chosen based on customer preferences (e.g. customer prefers visual mechanism rather than smell) or based on the type of product to be sold (e.g., emitting sound rather than visual mechanism when highlighting music CDs). It is also contemplated, that the highlighter may be built with only one specific mechanism for highlighting specific items on the shelves (e.g., the manufacturer of the item, or the owner of the store may prefer visual highlighters).

It is also noted that server 108 is not necessary since a profile of the consumer may also be directly stored on the mobile device 100 itself. In this example, the mobile device 100 may simply detect its position based on the beacon signal, and then send the profile to the highlighters 104-106, as discussed in more detail below, or simply send controls to the highlighters 104-106 to highlight the specific items on the shelves. The specific items on the shelves may have already been preloaded into the mobile device prior to entering the store, or may be retrieved by the mobile device when in the store from an in-store or external database that keeps track of items on the shelves within the store.

Figure 2:
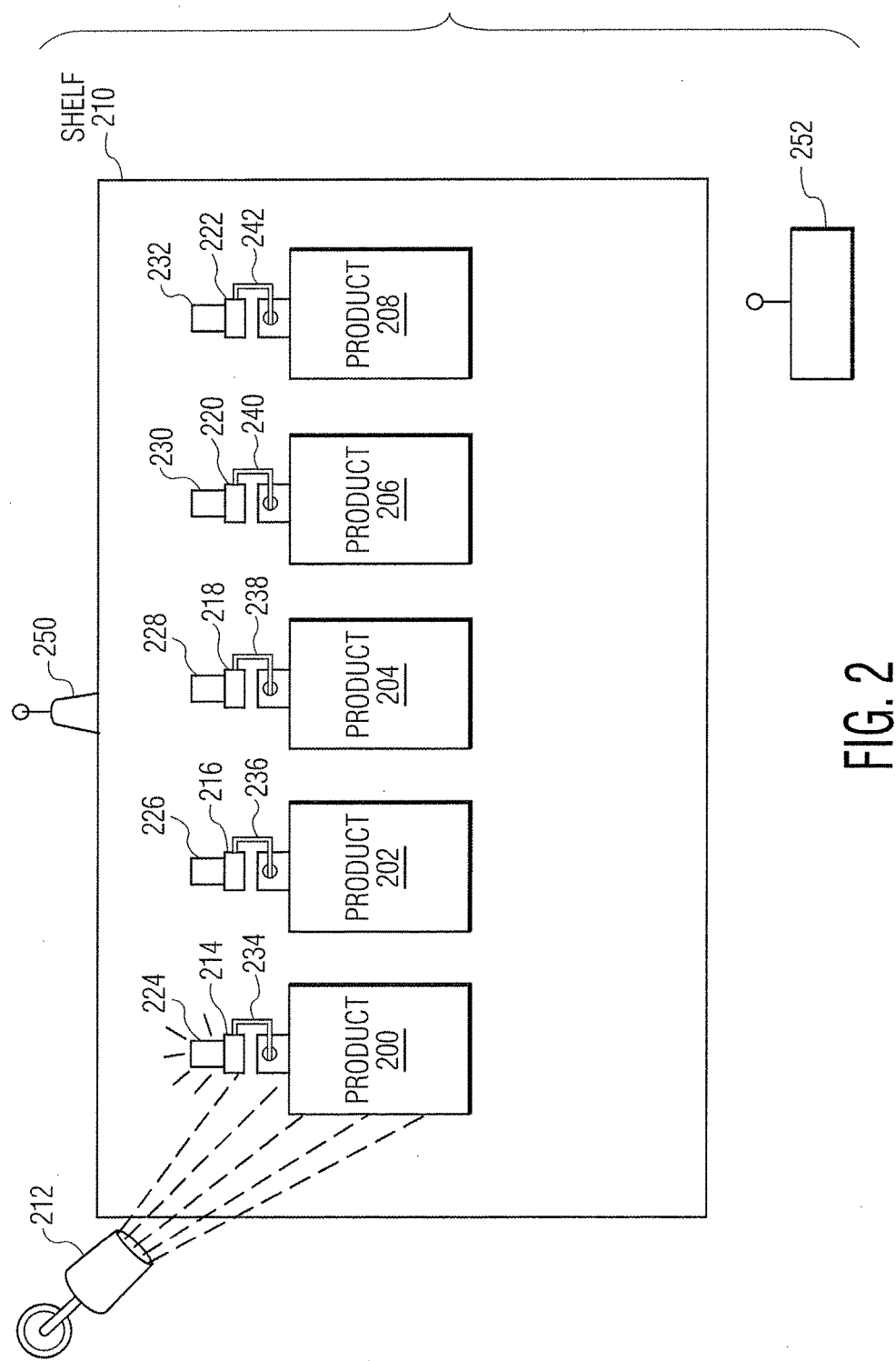
FIG. 2 shows a store rack that includes various products to be highlighted by various highlighters.

An example of a store rack 210 is shown in FIG. 2. Specifically, five different items (for ease of explanation) are shown on rack 210. These include products 200, 202, 204, 206 and 208. Each of these products may be hanging from the rack via hooks 234, 236, 238, 240 and 242 or other mounting implements. The hooks may have price tags 214, 216, 218, 220 and 222 as usual mounted thereon, or the price tags may be electronically displayed and changeable.

In addition to the price tags, however, an additional highlighter 224, 226, 228, 230 and 232 may also be mounted on the hook or somewhere in proximity to the particular product that it has been designated to highlight. Another option is to have a spotlight 212 mounted to the rack, the wall or to the ceiling of the store that is motorized and rotatable to throw a directive spotlight on the one or more of the various products on the shelf. A centralized processor 252 located in a remote location of the store may also be included. It is noted that each of the various highlighters described above may be designated to highlight a specific item on the shelf, or may be reconfigurable to highlight one or more of the items on the hooks sequentially or simultaneously.

In an example, assuming a consumer with a mobile phone is walking down an aisle which includes rack 210. Based on the user's profile, it may be assumed that product 200 may be of interest to the consumer for purchase. Products 202, 204, 206, 208 may not be of interest, or may not be compatible with the particular consumer's devices (assuming that the products on the shelves are cellphone accessories). As the user walks down the aisle with rack 210, highlighter 224 may detect the presence and ID of the mobile device, retrieve the profile from the backend server based on the ID and highlight product 200 based on the profile, which may indicate that product 200 is of interest to the consumer.

In one example, highlighter 224 may include a light (e.g., LED) or some other indicator that allows the consumer to easily spot that product 200 is being highlighted on the rack. Alternatively, spotlight 212 may be controlled to throw a spotlight on product 200. This spotlight may be used in conjunction with highlighter 224 or in place of highlighter 224 (assuming highlighter 224 was not mounted on the rack). Spotlight 212 may be controlled by a processor (not shown) that is in communication with the customer's mobile device as the customer walks through the store, and the backend server through the network.

Although this example is described with highlighters 224-232 being mounted to each of the products, in other examples it may not be mounted directly to the product hooks. A single highlighter such as spotlight 212 may be utilized in some examples, or the highlighters may be mounted somewhere on the rack in proximity to the products.

It is also noted that the mobile device may determine its own location with respect to the highlighters, determine its own profile or retrieve its profile from the backend server itself using the mobile ID, and then send controls to highlighters (i.e., highlighters which will simply act as dummies receiving controls from a mobile device). In another example, assuming the highlighters do not have location determination capabilities, a centralized location device (separate from the highlighters) such as beacon transmitter 250 (controlled by the highlighter or central processor 252) may be used to determine the location of the mobile devices in the store. The location information may then be communicated to the individual highlighters.

It is noted that either the highlighter, mobile device, or a centralized processor in the store using external beacons can detect the location of the mobile device within the store and/or the mobile ID. Either of these devices can either already have the profile stored thereon, or access the profile from a backend server using the mobile ID.

In one example, the retail display is backed with Bluetooth LE beacons (either in the highlighters themselves, or mounted in proximity to the items of the retail display) that are always ON and periodically advertising a Unique ID for each product. These Bluetooth LE beacons are also connected to a centralized microcontroller creating a Bluetooth piconet around the display. The customer's mobile device has an application installed that uses Bluetooth to listen for Bluetooth advertisements. When detected, the mobile device compares the Unique ID to see if it matches a beacon known to the service provider. The mobile device then sends a signal to the microcontroller/backend server, indicating that the user is in range of the piconet and the particular product in the store. The server/microcontroller then reacts accordingly and adapts the display to match the user by controlling one or more the various highlighters.

Figure 3A:
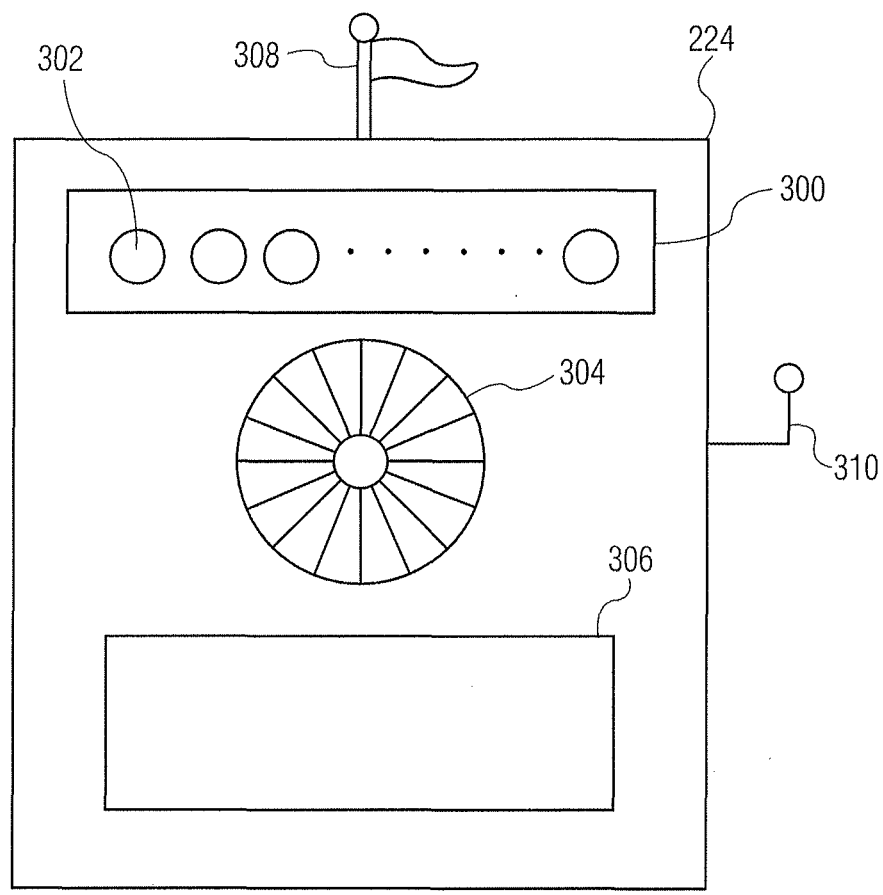
FIG. 3A shows an external view of the highlighter in FIG. 1.

As indicated above, the highlighters may include various ways of highlighting the items. An example of a highlighter is shown in FIG. 3A. Highlighter 224, for example, for highlighting product 200 may be an electronic unit that includes a processor and a transceiver (shown in a later drawing) or a connection to a centralized processor within the store (not shown). Highlighter 224 may also include one or more elements to implement various methods for highlighting the particular item. An example of such an element includes a light array 300 that includes LEDs 302 (and possibly different color LEDs). As another example, the highlighter 224 may include a speaker 304 for emitting sound, a smell box 306 that may include a fan that is able to blow air through or across the smell box thereby emitting a scent in the vicinity of the item. As yet another example, the highlighter 224 may include other types of indicators such as physical flags 308 that may pop up or pop down depending on the user's profile. Device 224 may also have antenna 310 for communicating to various wireless devices such as the mobile devices, beacon transmitters and centralized processors in the store. In other embodiments, the LEDs may be replaced or supplemented with graphic images, such as arrows or icons, which may be customized for each particular customer.

Figure 3B:
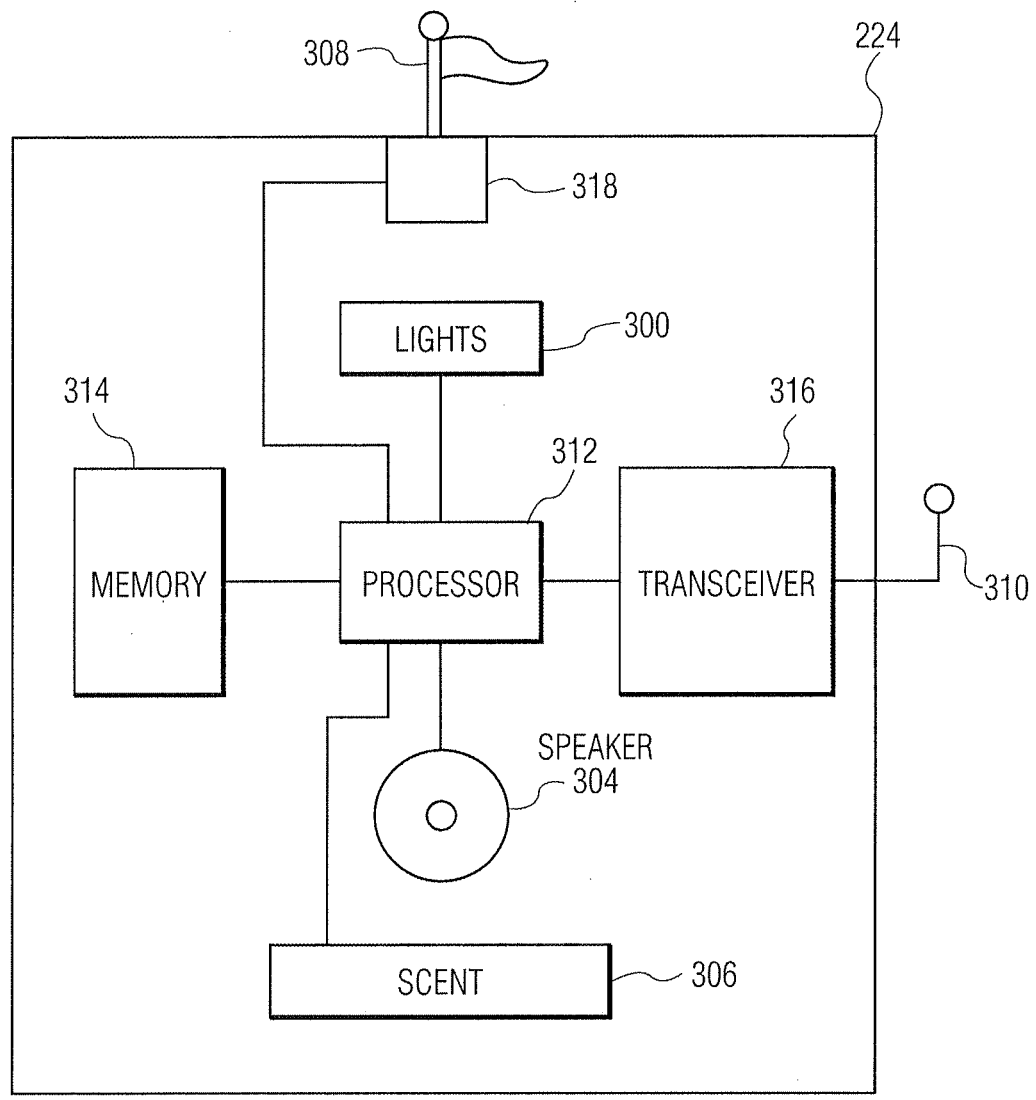
FIG. 3B shows an internal block diagram of the highlighter in FIG. 3A.

FIG. 3B shows the internal components of highlighter 224 in FIG. 3A. Device 224 may include a processor 312 for controlling the overall device, memory 314 for storing data, transceiver 316 for allowing communication between device 224 and other external devices via antenna 310, and actuator 318 for causing flag 308 to be extended and retracted.

Figure 3C:
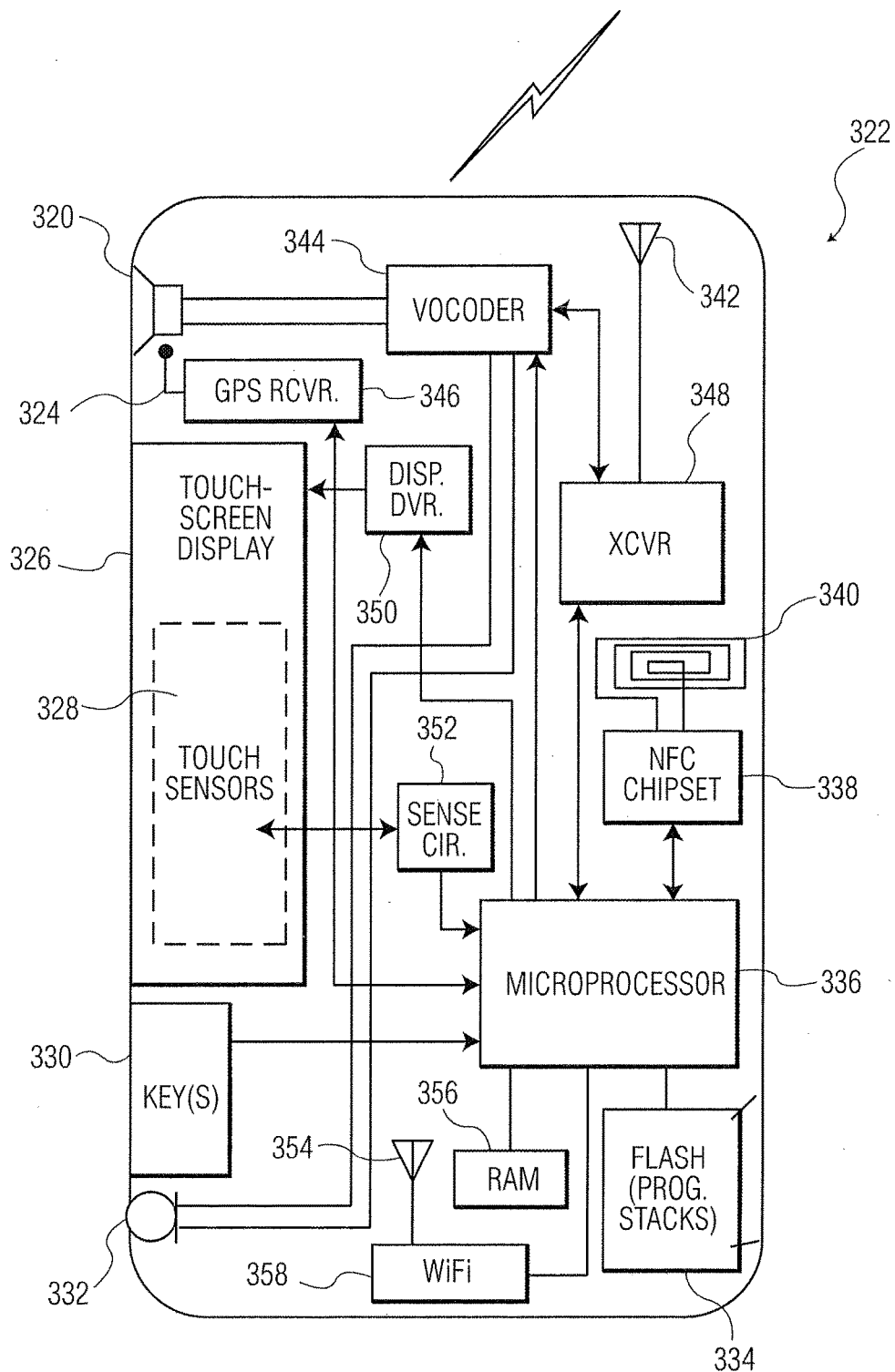
FIG. 3C shows an internal block diagram of the mobile device in FIG. 1.

FIG. 3C shows an example of internal components of mobile device 100 shown in FIG. 1. It should be appreciated that although the examples described throughout have been utilizing Bluetooth communications, the disclosed subject matter may also be implemented using other communication technology standards such as NFC communication capability, mobile communication capability and other radio frequency (RF) communications.

In the example of FIG. 3C, the mobile device 322 is in the form of a smart phone type mobile handset including a touch screen display. Examples of touch screen type mobile devices that may be used to implement mobile device 322 may include, but are not limited to, a smart phone, personal digital assistant (PDA), tablet computer or other portable device. However, the structure and operation of the touch screen type mobile device 11 is provided by way of example; and the subject technology as described herein is not intended to be limited thereto. For purposes of this discussion, FIG. 3C provides a block diagram illustration of the exemplary mobile device 322 having a touch screen display for displaying content and receiving user input as or as part of the user interface.

Hence, in the example shown in FIG. 3C, mobile device 322 includes a microphone 332 for audio signal input and a speaker 320 for audio signal output. The microphone 332 and speaker 324 are communicatively coupled to a voice or audio encoder/decoder (vocoder) 344.

Also, as shown in FIG. 3C, the mobile device 322 includes at least one digital transceiver (XCVR) 348, for digital wireless communications via a wide area wireless mobile communication network, although the mobile device 322 may include additional digital or analog transceivers (not shown).

Examples of such transceivers include, but are not limited to transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G."

Transceiver 348 connects through radio frequency (RF) send-and-receive amplifiers (not separately shown) to an antenna 342. Transceiver 348 may also support various types of mobile messaging services, such as short message service (SMS), enhanced messaging service (EMS) and/or multimedia messaging service (MMS).

Many modern mobile devices also support wireless local area network communications over WiFi, instead of or in addition to data communications using the wide area mobile communication network. Hence, in the example of FIG. 3C, for packet data communications, the exemplary device 322 also includes a WiFi transceiver 358 and associated antenna 354. It is noted, that the highlighters and central processor may also include these types of transceivers for providing wireless communication capabilities.

Mobile device 322 further includes a microprocessor (or "processor") 336, which serves as a programmable controller for mobile device 322 by configuring mobile device 322 to perform various operations, for example, in accordance with instructions or programming executable by processor 336. A flash memory 334 is also used to store, for example, programming or instructions for execution by the processor 336. Mobile device 322 may also include a non-volatile random access memory (RAM) 356 for a working data processing memory.

For discussion purposes, in the smart phone example shown in FIG. 3C, the user interface elements of mobile device 322 include a touch screen display 326 (also referred to herein as "touch screen 326" or "display 326"). For output purposes, the touch screen 326 will include a display screen, such as a liquid crystal display (LCD) or the like. For input purposes, touch screen display 326 includes a plurality of touch sensors 328. Other interface elements may include a keypad including one or more keys 330.

In some implementations, the microphone 332 and speaker 320 may be used as additional user interface elements, for audio input and output, including with respect to some functions related to the transaction processing and communication, as described herein.

Processor 336 controls visible display output on the LCD or other display element of the touch screen display 326 via a display driver 350, to present the various visible outputs to the device user. For example, some of the transaction related programming may cause the processor 336 to operate the driver 350 to cause screen 326 to display visible multimedia information As shown in FIG. 3C, mobile device 322 also includes a sense circuit 352 coupled to touch sensors 328 for detecting the occurrence and relative location/position of each touch with respect to a content display area of touch screen display 326.

There are also a variety of ways that a mobile device may be configured to obtain information as to current location of the device. In our example, the mobile device 322 includes a global positioning satellite (GPS) receiver 346 and associated antenna 324. The mobile device 322 may also have NFC communication capability through NFC chipset 338 and NFC antenna 340.

In one example, where GPS signals are available, the mobile device may utilize its GPS receiver to determine its location. This location information along with the ID can then be transmitted to the highlighter, the central processor, or directly to the backend server to retrieve the appropriate profile and highlight the appropriate items on display based on the mobile device location relative to the items on display. If GPS is not available, a simple ping between the beacon and the mobile device could be utilized to determine the mobile device location relative to the items in the store as described above.

Figure 3D:
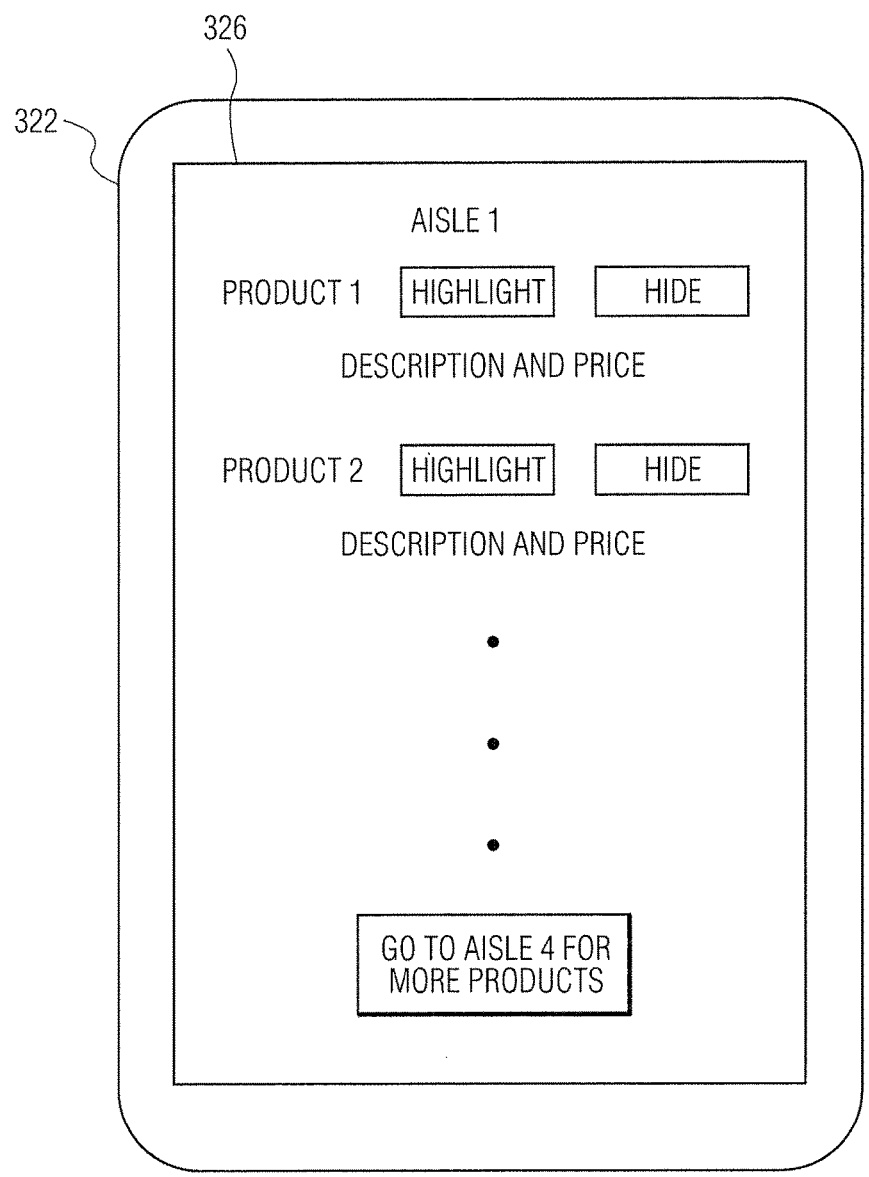
FIG. 3D shows an example of a screen shot of a possible mobile application running on the mobile device in FIG. 3C.

FIG. 3D shows an example of an application running on mobile device 322 and being displayed to the shopper on screen 326. As the shopper travels through the store, mobile device 322 may visually display items of interest to the shopper. These items may have pictures, and/or descriptions, and/or prices shown on the screen. The mobile application may also provide control buttons to the user. The user may touch the control buttons to highlight or hide certain items in the store. For example, if the user touches the highlight button, then mobile device 322 may send a control signal to the appropriate highlighter in the store (e.g. a highlighter in the aisle where the customer is located) to highlight the selected item. This selection allows the user to pick and choose which items are highlighted. The application may also provide other information that tells the shopper where more interested products/services can be found (e.g. in a different aisle). In general, the application interacts with the highlighters, central processor, beacon transmitters and backend server in the system.

Figure 3E:
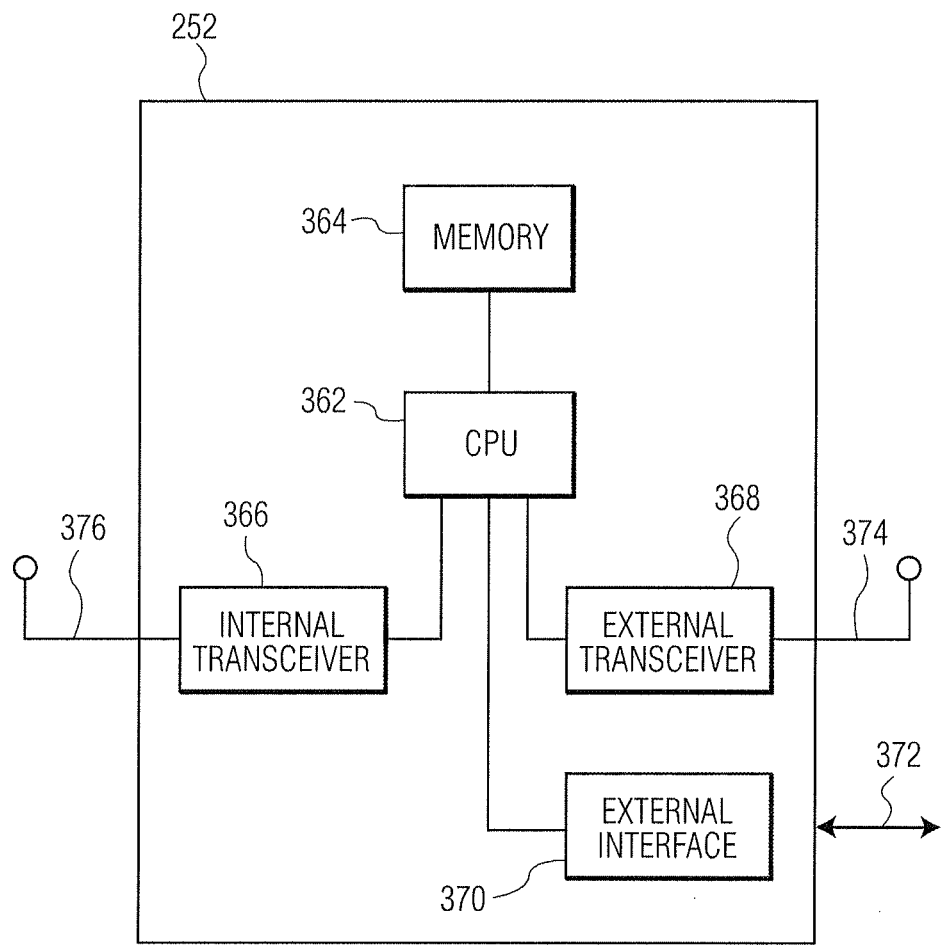
FIG. 3E shows an internal block diagram of the central processor system in FIG. 1.

FIG. 3E shows an example of the internal components of the central processor 114 and 252 shown in FIGS. 1 and 2 respectively. Central processor 252 in the store may include a processor 362, memory 364, an internal transceiver 366 and antenna 376 for performing communication internal to the store, and external transceiver 368 and antenna 374 for performing communication external to the store. Processor 252 may also include external LAN line 372 for external communications.

Figure 4:
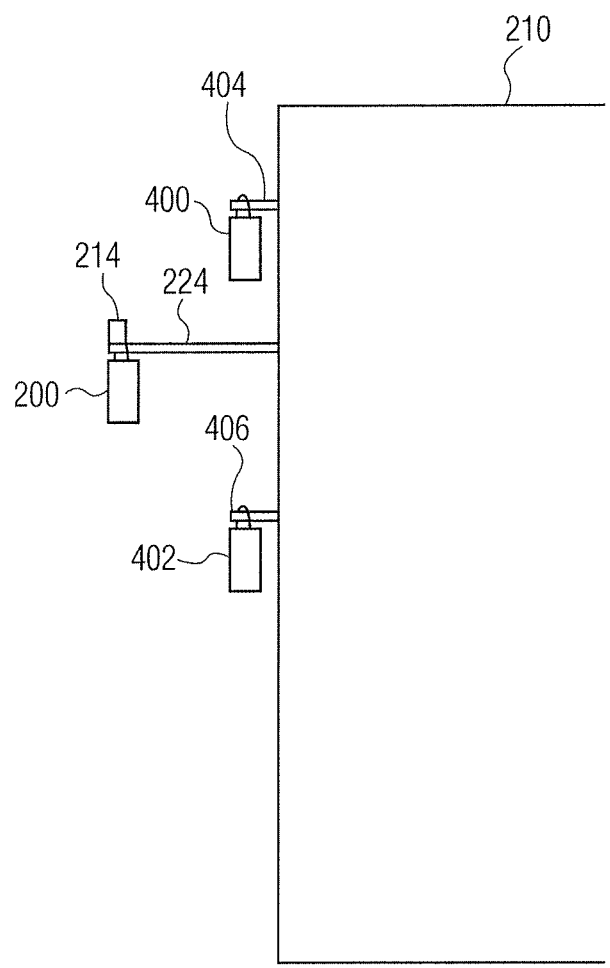
FIG. 4 shows a side view of the store rack shown in FIG. 2 with the product protruding from a store rack.

Shown in FIG. 4 is a side view of rack 210 shown in FIG. 2. In this example, each of the products does not have a particular highlighter 224-232 mounted to hook 224 on rack 210. In this example, hook 224 is actually retrofitted with a motor or some other type of mechanical actuator that allows the product to extend and retract from rack 210. Thus, in one example, when the consumer is walking down the aisle, the system determines (based on the consumer's profile) that product 200 may be of interest. A centralized processor (not shown) within the store may then send a control signal to the motorized device or actuator to extend hook 224, thereby allowing product 200 to protrude from rack 210 and consequently allowing the user to easily spot the product that is of interest. In another example (although not shown), the motorized actuator may cause other types of movement of product 200 such as vibrations or oscillations that may catch the consumer's eye. Movement may also be accomplished in the latter case by providing a track along with the actuator so that the product of interest moves in a predetermined pattern (such as a small circle) or to a predetermined area on rack 210.

Figure 5:
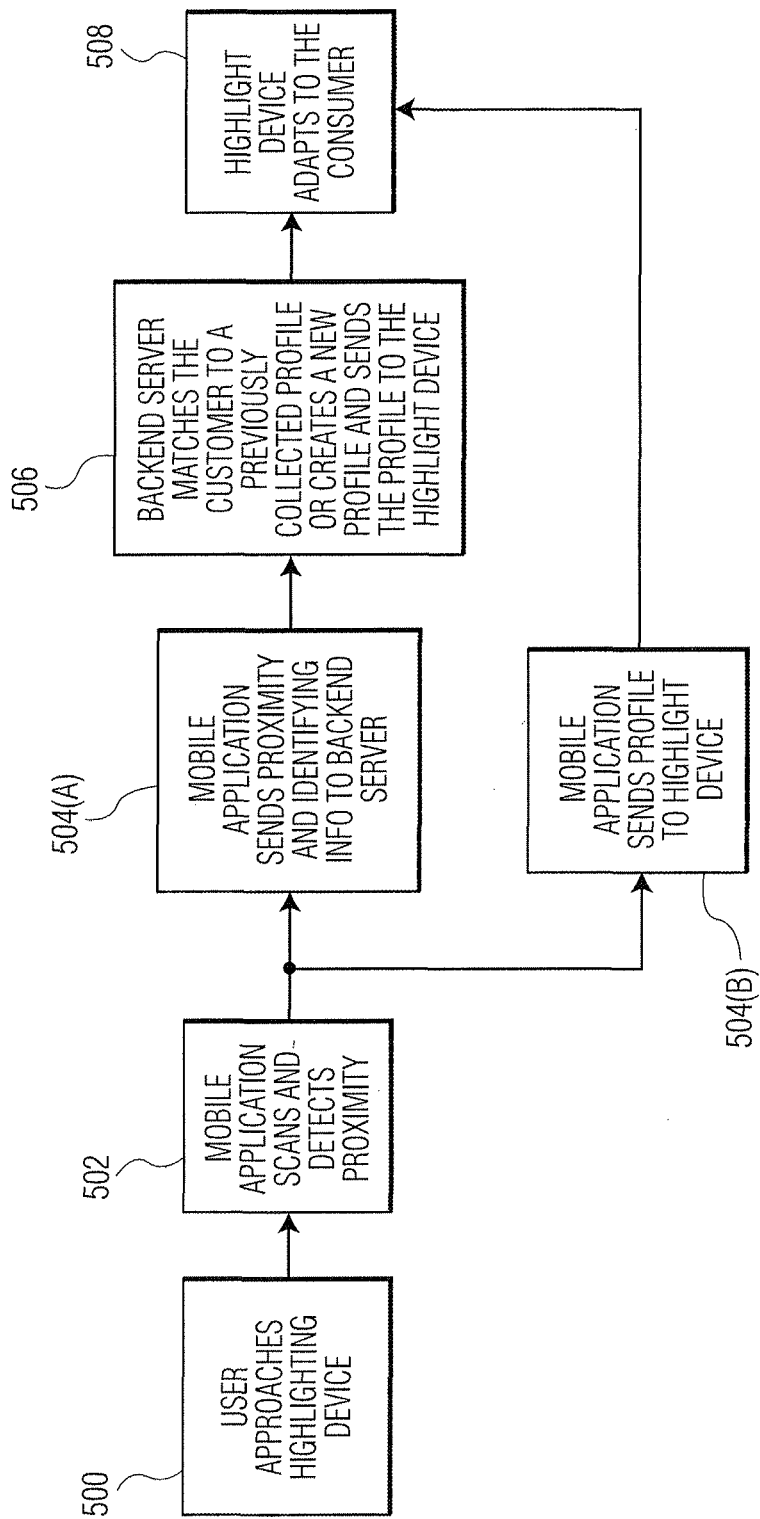
FIG. 5 shows a flowchart of the method for controlling the highlighter based on the user's mobile phone and profile.

Shown in FIG. 5 is a flowchart that describes an example of how the system may operate. Specifically, in step 500, the consumer is walking through a store and approaches a particular item. In step 502, an application on the mobile device scans for a transmitted beacon, and detects proximity of the mobile device to the particular highlighter or devices near the item. In one example (step 504(B) and step 508), the mobile application running on the mobile device may send the profile to the highlighter. The highlighter then uses the profile to make a decision as to which item(s) should be highlighted. Alternatively in step 504(B), a simple control signal (not the actual profile) may be sent to the highlighter instructing the highlighter to highlight an item, either by the mobile device or by a controller in the store.

As already indicated, the profile may be already stored on the mobile device or may be (or already have been) accessed from a backend server (not shown in FIG. 5) using a mobile ID. Alternatively, in steps 504(A), 506 and 508, the mobile application may send proximity and identifying information (e.g. mobile ID such as a MDN or a temporary or permanent ID assigned to the device by the store at the store or prior to the visit) to the backend server, the backend server may match the consumer to an already stored profile, or may create a new profile for the consumer. The backend server may then send the profile or a simple control command to the highlighter, thereby allowing the highlighter to either utilize the profile or the control signal to adapt to the consumer. As can be seen by FIG. 5, there are a number of methods for performing the detection of the mobile device, the retrieval and generation of the profile and the controlling of the highlighter within the store.

Figure 6:
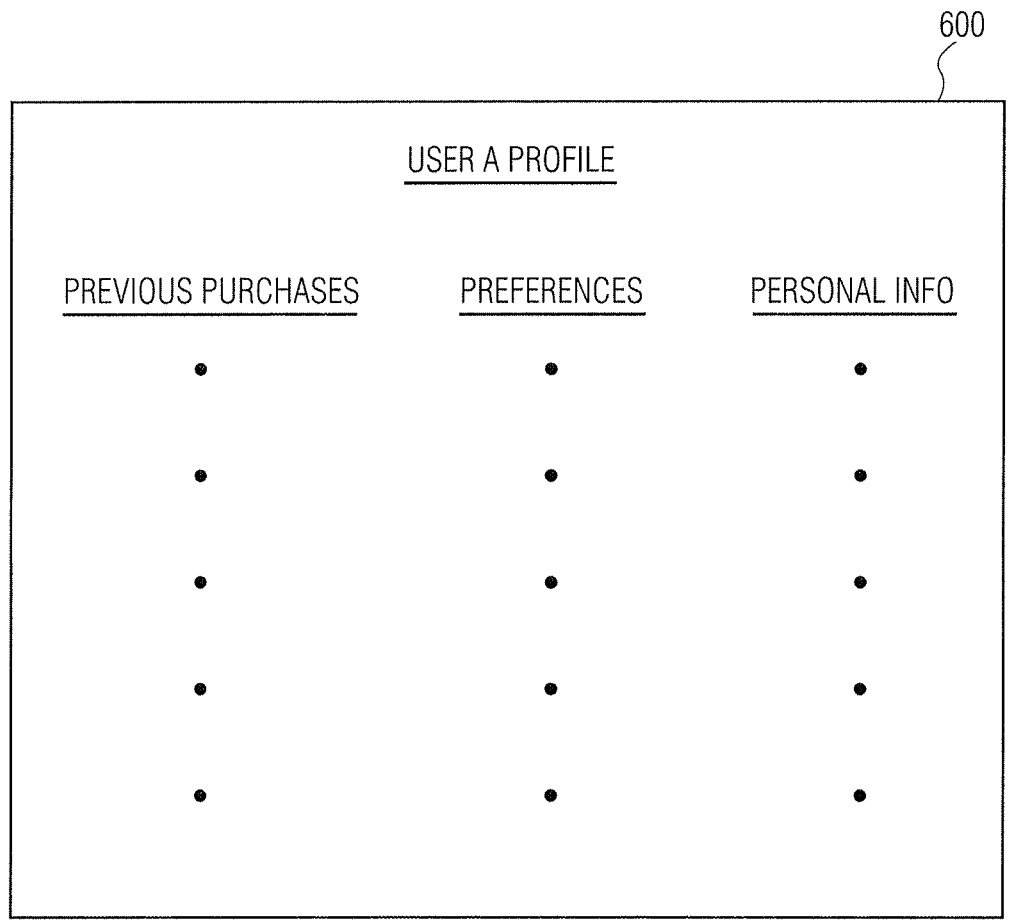
FIG. 6 shows an example of a user profile stored either on the mobile phone or on a backend server.

The profile may include various information of the mobile device itself or the consumer of the mobile device. An example of such a profile is shown in FIG. 6, where profile 600 of user A is shown. Some of the topics within the profile may include previous purchases of the consumer, personal preferences of the consumer, personal information of the consumer as well as many others.

For example, assuming that the highlighters are related to cellphone accessories, then the previous purchase of the user (e.g., the model of the user's cellphone itself) may be listed within the profile. This profile may then be utilized by the backend server, the mobile device and the highlighters to highlight specific cellphone accessories that are compatible with the mobile device.

This system may also be utilized in various other examples for enhancing the user's shopping experience. For example, assuming a consumer is walking through a clothing store, the system may utilize the personal information of the user (i.e., the user's shirt, pant and shoe sizes) as well as the user's preferences (i.e., particular name brands that the user prefers) along with the user's previous purchases. All these pieces of information may be utilized by the system, possibly with other pieces of information, in order to highlight and suggest new purchases in which the consumer may be interested (e.g., new clothing or shoes that the consumer may be interested in purchasing).

The user's preferences may also include a price range of particular items, a particular shopping list or other lifestyle information such as athletic lifestyle, outdoorsman, etc. This information may all be utilized and processed in a way to bring about a meaningful experience and highlight specific items throughout the store that may enhance the user's shopping experience.

It is contemplated that various users of mobile devices may be shopping in the store simultaneously. These users may walk down a particular aisle and may be both within a predetermined distance of a particular item simultaneously. In order to address this conflict, the system may utilize different means for highlighting these items for different users. Specifically, the highlighter may include various colored LEDs. The particular users may each be assigned a color that will be displayed on their mobile device such as blue and red. User A may see highlighted items in red, while as user B may see highlighted items in blue. These colors will allow each user to distinguish their recommendations from recommendations aimed at the other shoppers in the store.

In another example, these different colors may represent specific products associated with a particular color. For example, a red color may be used for products of a company that is known for red colors in their name/logo. If the shopper is color blind, the color of interest for the name/logo could also be audibly stated through a speaker.

Although not shown in FIG. 6, the profile may also include other private information such as items or services that may be of private concern to the consumer. The consumer may not want these items to be highlighted within the store since other consumers may see these highlighted items leading to embarrassment or unwanted attention. Specifically, a consumer may be looking for a particular medication that may be of a sensitive nature or clothing of a particular type. The consumer may not want this medication or clothing highlighted on the rack so that other consumers can see what they are purchasing or have purchased in the past. In this instance, the system may wait for the consumer to be alone in the aisle before the item is highlighted (i.e., the system makes sure that no other mobile devices are within proximity of the user) or may eliminate highlighting such items entirely. This may be automatic for certain types of items or may be based on user input such that the user may, prior to or immediately after entering the store, deselect such items. Privacy may also be preserved by disabling the highlighter in the store, and then indicating/identifying the product on the user's mobile phone either visually or audibly if the user is wearing earphones connected to the mobile phone.

As described above, the method and system for highlighting items may be implemented in various scenarios (i.e. department stores to highlight a product on a shelf based on user profiles). Below are a list and description of some examples of the system being implemented.

As discussed above, smells can be utilized to attract customers. Some examples of stores that could utilize smells to attract customers are perfume stores, candle stores, grocery stores and restaurants. For example, perfume stores can allow customers to test aromas, restaurants can attract customers with aromas from menu items, candle stores can allow customers to smell the products without unwrapping the actual candles, and grocery stores can entice customers with aromas of certain products. In one example these aromas are emitted by the highlight device when it is detected that the customer is located near the product and/or has desire to smell the product.

Sounds can also be utilized to attract customers. One example of a store that could use sound would include music stores that could output a short clip of music that is appealing to the customer based on the customer's music preferences. The clip could be played directly through speakers on the highlight device, or transmitted to the customer's mobile device. This will allow the customer to get a sample of preferred genres of music to entice the customer to purchase the music.

Another example of "wayfinding" using sounds could be to aid blind persons (e.g. customers and/or employees) in easily locating products. In general, this technique could be used to make the store more accessible and easier for people (e.g. blind persons) to navigate through the store. This technique could also help the store in complying with various government regulations and mandates. For example, low vision persons with poor eyesight may be directed to a product by sounds or voice directions emitted by the highlight device and/or the mobile device. Information of a product could be emitted from the speakers of the highlight device or mobile device when the low vision and/or blind person is near the product. Audio could also be output from speakers when the person enters the store (e.g., store greeting). Audio directions and offers could generally be made to the person as they travel throughout the store. This audio description can also provide a mental map which will help train low vision and/or blind employees to understand the store layout better including products/services offered by the store.

As discussed above, movement of the product can be utilized to attract customers. The product on the shelf can be physically moved. For example, compatible items may move closer to the customer while incompatible items move away from the customer, or do not move at all.

Displays can also be used to attract customers. For example, a customer interested in fitness may step into a section of the store that includes fitness products. When the mobile device is detected, a display or projector will visually display pictures/videos or an interactive live demonstration of fitness products/services that are available for purchase. These videos may also include closed captioning for noisy environments or persons with limited hearing. Fitness related products can also be highlighted on the shelves.

Combinations of various sounds, movements, smells, lights, etc. may also be used to entice, evoke an emotive feeling, or guide a customer. For example, in a children's toy store, a combination of sound and lights may work well in gaining the child's attention for certain toys/games available for purchase, trial periods or pre-ordering. The children may also be able to interact with certain toys through their parent's mobile device (e.g. see commercials/features of a product). Similarly, different highlighting combinations may be used to differentiate among different customers.

Combinations of different interaction styles create a universal design for all types of users. A combination of light, sound and vibrations may be more accessible for persons with poor eyesight (e.g. Blind or low vision users), and/or hearing (e.g. Deaf or hard of hearing users). A sound may be emitted by the customer's mobile device or the highlight device itself. A light may also be projected on the product. If the customer cannot hear or see well, vibrations or outputs from haptic adjuncts such as Braille devices can also be emitted by the customers mobile device or a device controlled by the user's mobile device to let them know that they are near a product. Multi-modal presentations may also be used. For example, the same pattern or cadence may be presented to the user visually, audibly or haptically.

In general, the highlight system can also be useful in guiding customers through stores (i.e. giving directions). For example, when entering a grocery store, a customer's grocery list may be analyzed by the system. Various lights and/or sounds may be emitted throughout the store in a particular sequence to guide the customer to their desired products in the most efficient manner (e.g. aisle numbers can be highlighted). The mobile device can also emit audio and/or visual directions to the customer to navigate to a particular location such as "start in aisle 2" and "go to aisle 4", etc.

In large non-store buildings, such as schools, government buildings, office buildings etc., guidance information could be helpful. Various lights and sounds can be emitted throughout these buildings by the mobile device and/or highlight device to guide the user of the mobile device to their desired destination in the building (e.g. a specific suite). As described above, these various sounds and lights may be triggered when the mobile device responds to a ping in the vicinity of the highlight device and/or the beacon transmitter.

Figure 7:
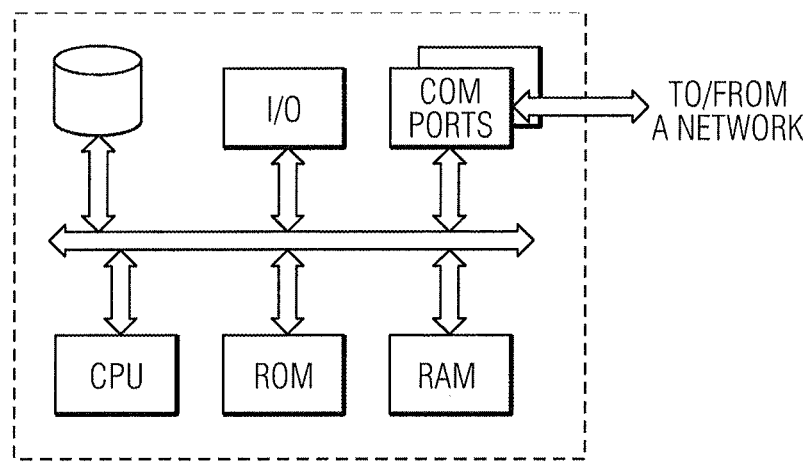
FIG. 7 is a simplified functional block diagram of a computer that may be configured as a host or server, for example, to function as the backend server in the system of FIG. 1.
Figure 8:
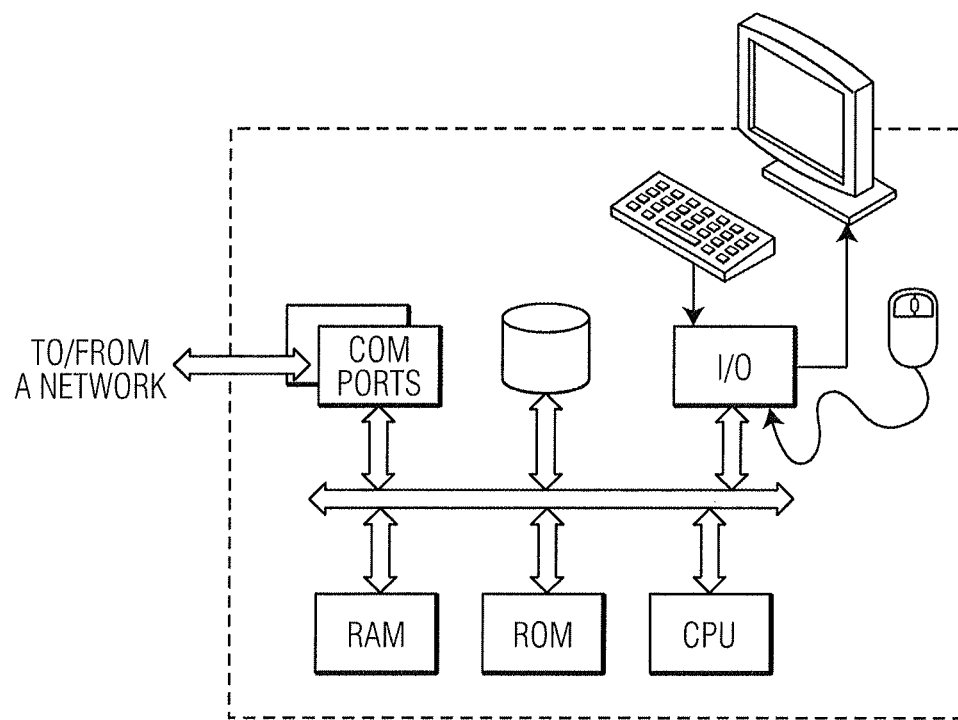
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that the general structure and general operation of such equipment as shown in FIGS. 7 and 8 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing the personalized shopping experience outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the highlighters and the in store processing system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile devices, highlighters, servers, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A system including:
    a highlighter,
        the highlighter to highlight a physical position of an item on a display in a store;
    a beacon associated with the item,
        the beacon transmitting a beacon signal,
    a movement device coupled to the item,
        the movement device comprising a motorized mechanism to cause the item to extend from and retract toward the display,
    a server storing a profile of a user,
        the profile including information regarding one or more items of interest to the user,
        the one or more items including the item, and
        the profile further including at least one of:
            previous purchases of the user,
            personal preferences of the user, or
            personal information of the user; and
    a processor to:
        determine a location and an identification (ID) of a mobile device of the user based on the mobile device receiving the beacon signal,
        retrieve the profile of the user of the mobile device based on the ID,
        control the highlighter to highlight the item based on the location of the mobile device being within a particular distance of the item and based on the item being determined to be of interest to the user of the mobile device,
        control the movement device to cause the item to extend away from the display based on the location of the mobile device being within the particular distance, and
        control, after the movement device has caused the item to extend away from the display, the movement device to cause the item to retract toward the display based on the location of the mobile device not being within the particular distance.

2. The system of claim 1, wherein the processor, when controlling the highlighter, is to:
    control the highlighter to highlight the item using at least one of:
        an area light to illuminate a proximity of the item,
        a directed light to illuminate the item,
        a sound emitter to emit a sound in proximity to the item, or
        an aroma emitter to emit a particular odor in proximity to the item.

3. The system of claim 1, further comprising a transceiver,
    the transceiver transmitting the beacon signal and receiving a response signal from the mobile device to determine the location of the mobile device,
        the response signal including the ID of the mobile device.

4. The system of claim 1,
    wherein the profile includes information regarding privacy parameters,
        the privacy parameters being used to control highlighting of the item when the item is determined to be a private item, and
    wherein the processor, when controlling the highlighter to highlight the item, is to:
        determine that no other mobile devices are within a proximity of the item, and
        control the highlighter to highlight the private item after determining that no other mobile devices are within the proximity of the item.

5. The system of claim 1, wherein the movement device includes another motorized mechanism that causes another item to at least one of vibrate or oscillate.

6. The system of claim 1, wherein the highlighter is a first highlighter and the item is a first item, and
    wherein a second highlighter highlights a second item in a different manner than the first highlighter highlights the first item,
        the second item being of interest to a second user.

7. The system of claim 1, where the processor is further to:
    control the highlighter to highlight the physical position of the item using at least one of a light or a sound based on the user having a disability,
        wherein information identifying the disability is provided in the profile of the user.

8. A method including:
    receiving, by a device, location information and an identification (ID) of a mobile device,
        the location information indicating that a location of the mobile device is within a particular distance of an item on a display in a store,
        the location information being based on the mobile device receiving a beacon signal from a beacon associated with the item;
    retrieving, by the device and from a server, a profile of a user of the mobile device based on the ID,
        the profile including information regarding one or more items of interest to the user,
        the one or more items including the item, and
        the profile further including at least one of:
            previous purchases of the user,
            personal preferences of the user, or personal information of the user;
controlling, by the device, a highlighter to highlight a physical position of the item based on the location of the mobile device being within the particular distance of the item and based on the item being of interest to the user; and
controlling, by the device, a movement device, which includes a motorized mechanism, to cause the item to extend from and retract toward the display,
the controlling the movement device comprising:
controlling the movement device to cause the item to extend away from the display based on the location of the mobile device being within the particular distance, and
controlling, after the movement device has caused the item to extend away from the display, the movement device to cause the item to retract toward the display based on the location of the mobile device not being within the particular distance.

9. The method of claim 8, where controlling the highlighter further comprises:
controlling the highlighter to highlight the physical position of the item by using at least one of:
an area light to illuminate a proximity of the item,
a directed light to illuminate the item,
a sound emitter to emit a sound in proximity to the item, or
an aroma emitter to emit a particular odor in proximity to the item.

10. The method of claim 8, further comprising:
controlling the highlighter to highlight the physical position of the item using at least one of a light or a sound based on the user having a disability,
wherein information identifying the disability is provided in the profile of the user.

11. The method of claim 8, further comprising:
sending instructions to the mobile device to output at least one of an image, a sound, or a vibration based on accessibility settings or preferences provided in the profile of the user.

12. The method of claim 8,
wherein the profile includes information regarding privacy parameters,
the privacy parameters being used to control highlighting of the item when the item is determined to be a private item, and
wherein controlling the highlighter to highlight the item comprises:
determining that no other mobile devices are within a proximity of the item, and
controlling the highlighter to highlight the private item after determining that no other mobile devices are within the proximity of the item.

13. The method of claim 8, wherein the movement device includes another motorized mechanism that causes another item to at least one of vibrate or oscillate.

14. The method of claim 8, wherein the highlighter is a first highlighter and the item is a first item, and
wherein a second highlighter highlights a second item in a different manner than the first highlighter highlights the first item,
the second item being of interest to a second user.

15. A non-transitory computer-readable medium storing instructions, the instructions comprising:
a plurality of instructions that, when executed by a processor, cause the processor to:
receive location information and an identification (ID) of a mobile device,
the location information indicating that a location of the mobile device is within a particular distance of an item on a display in a store,
the location information being based on the mobile device receiving a beacon signal from a beacon associated with the item;
retrieve, from a server, a profile of a user of the mobile device based on the ID,
the profile including information regarding one or more items of interest to the user,
the one or more items including the item, and
the profile further including at least one of:
previous purchases of the user,
personal preferences of the user, or
personal information of the user;
control a highlighter to highlight a physical position of the item based on the location of the mobile device being within the particular distance of the item and based on the item being of interest to the user; and
control a movement device, which includes a motorized mechanism, to cause the item to extend from and retract toward the display, including:
control the movement device to cause the item to extend away from the display based on the location of the mobile device being within the particular distance, and
control, after the movement device has caused the item to extend away from the display, the movement device to cause the item to retract toward the display based on the location of the mobile device not being within the particular distance.

16. The non-transitory computer-readable medium of claim 15, where the plurality of instructions, to control the highlighter to highlight the physical position of the item, cause the processor to:
control the highlighter to highlight the physical position of the item by using at least one of:
an area light to illuminate a proximity of the item,
a directed light to illuminate the item,
a sound emitter to emit a sound in proximity to the item, or
an aroma emitter to emit a particular odor in proximity to the item.

17. The non-transitory computer-readable medium of claim 15, where the plurality of instructions further cause the processor to:
control the highlighter to highlight the physical position of the item using at least one of a light or a sound based on the user having a disability,
wherein information identifying the disability is provided in the profile of the user.

18. The non-transitory computer-readable medium of claim 15, where the plurality of instructions further cause the processor to:
send instructions to the mobile device to output at least one of an image, a sound, or a vibration based on accessibility settings or preferences provided in the profile of the user.

19. The non-transitory computer-readable medium of claim 15, wherein the movement device includes another motorized mechanism that causes another item to at least one of vibrate or oscillate.

20. The non-transitory computer-readable medium of claim 15, wherein the highlighter is a first highlighter and the item is a first item, and wherein a second highlighter highlights a second item in a different manner than the first highlighter highlights the first item,
the second item being of interest to a second user.

* * * * *